United States Patent [19]
Tomita et al.

[11] Patent Number: 5,229,878
[45] Date of Patent: Jul. 20, 1993

[54] METHOD AND APPARATUS FOR MODULATING LIGHT USING SEMICONDUCTOR ELEMENT HAVING QUANTUM WELL STRUCTURE

[75] Inventors: Yasuo Tomita, Yokohama; Hitoshi Oda, Sagamihara, both of Japan

[73] Assignee: Canon Kabushiki Kaisha, Tokyo, Japan

[21] Appl. No.: 724,800

[22] Filed: Jul. 2, 1991

[30]  Foreign Application Priority Data

Jul. 2, 1990 [JP] Japan .................................. 2-175079

[51] Int. Cl.$^5$ ............................................. H01L 27/14
[52] U.S. Cl. ................................. 359/248; 359/252; 257/21
[58] Field of Search ............... 359/248, 252, 222, 246; 257/21

[56]  References Cited

U.S. PATENT DOCUMENTS 3,470,375 9/1969 Chang ............................. 359/248

OTHER PUBLICATIONS

"New Photorefractive Effect in Graded-Gap Superlattices" by S. E. Ralph et al., Physical Review Letters, vol. 63, No. 20, Nov. 13, 1989, pp. 2272-2275.

"Quantum Well Structure" by M. Yamanishi, Applied Physics, vol. 58, No. 2, 1988, pp. 1698-1707.

"Ultrafast Optical Nonlinearity by Virtual Charge Polarization in DC-Biased Quantum Well Structures" by M. Yamanishi et al., IEEE Journal of Quantum Electronics, vol. 24, No. 2, Feb. 1988, pp. 325-331.

*Primary Examiner*—Paul M. Dzierzynski
*Assistant Examiner*—Don Wong
*Attorney, Agent, or Firm*—Fitzpatrick, Cella, Harper & Scinto

[57]  ABSTRACT

An optical modulation apparatus includes a semiconductor element having a quantum well structure, a unit for applying an electric field to the quantum well structure of the semiconductor element, a unit for supplying polarized probe light to the semiconductor element, the probe light emerging from the semiconductor element such that a polarization state thereof is changed by an electrooptical effect in the quantum well structure, a unit for causing the semiconductor element to receive pump light which causes virtual charge excitation in the quantum well structure, the virtual charge excitation screening the electric field applied to the quantum well structure, and a polarizer for converting a change in polarization state of the light emerging from the semiconductor element into a change in intensity.

29 Claims, 6 Drawing Sheets

F I G. 3
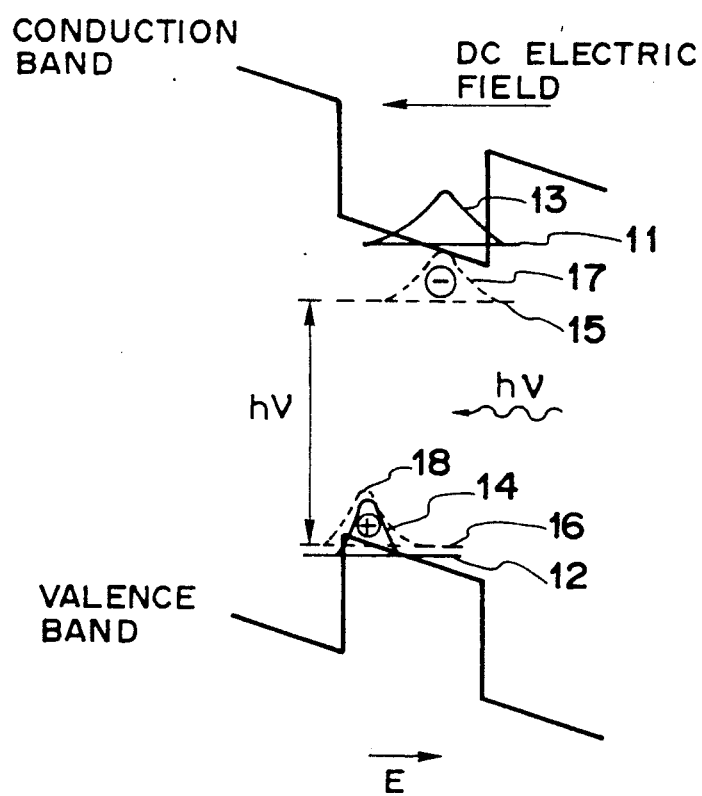

METHOD AND APPARATUS FOR MODULATING LIGHT USING SEMICONDUCTOR ELEMENT HAVING QUANTUM WELL STRUCTURE

BACKGROUND OF THE INVENTION

1. Field of the Invention

The present invention relates to a method and apparatus for modulating light using a semiconductor element having a quantum well structure at a very high speed on the order of picoseconds or less.

2. Related Background Art

A device utilizing a photorefractive (PR) effect is proposed as a conventional optical modulation apparatus. This PR effect will be described with reference to FIG. 1.

FIG. 1 is a diagram showing an energy band of a bulk electrooptical crystal. When an electron 41 located in a given impurity level 42 is optically excited and moved to a conduction band, this electron 41 is diffused and drifted in the conduction band and then captured by a capture level 43. A spatial electric field formed by this electron capture is subjected to a nonlinear change in refractive index by an electrooptical effect (i.e., a Pockels effect). This phenomenon is called the PR effect. The impurity level 42 is generally called a deep level having an energy gap sufficiently larger than that of thermal energy (26 meV) at room temperature with respect to a donor or acceptor level serving as a shallow level. The capture level 43 generally consists of an ionization level of the impurity level 42.

The PR effect has an advantage in that a nonlinear change in refractive index is obtained with a laser beam power of about several mW. However, the response speed of this change is a maximum of several microseconds because movement and capture of an optically excited carriers (i.e, electrons in this case) are utilized.

In order to increase the response speed, a semiconductor well structure having a barrier layer of a graded gap structure whose band gap is changed in the direction of the thickness of the layer is proposed in Physical Review Letters. Ralph et. al., Vol. 63, pp. 2272–2275 (1989). This semiconductor well structure is shown in FIGS. 2A to 2C. As shown in FIG. 2A, valence and conduction bands 51 and 52 of a barrier layer have graded gap structures, so that a built-in electric field is generated by these structures. In the built-in electric field, holes 53 and electrons 54 formed upon incidence of light on the graded gap barrier layer are drifted by the built-in electric field and are respectively captured by quantum wells 55 and 56 in the valence and conduction bands. At this time, the electrons 54 are captured earlier than the holes 53 by the quantum wells 56 due to a difference between drift speeds of the electrons 54 and the holes 53, as shown in FIG. 2B. For this reason, as shown in FIG. 2C, until the holes 53 are captured in the quantum wells 55, a transient spatial electric field is formed between the electrons 54 and the holes 53. This electric field induces a change in refractive index through an electrooptical effect in the barrier layer.

After both the electrons 54 and the holes 53 are captured by the quantum wells 56 and 55, no spatial separation is present between the electrons 54 and the holes 53. The above transient spatial electric field then disappears. The response speed of the PR effect in the above transient process is mainly determined by the drift time for which the electrons 54 are captured by the quantum wells 56. Therefore, a rise response speed can be experimentally confirmed to be on the order of about picoseconds.

A fall time is mainly determined by time required for capturing the holes 53 in the quantum wells 55 and is not limited by a recombination time of electrons 54 and the holes 53 because no spatial separation occurs between the electrons 54 and the holes 53, both of which are respectively captured in the quantum wells 56 and 55, and no spatial electric field is generated. Therefore, the recombination time does not contribute to the PR effect. Therefore, the fall time can be expected to obtain the range of the order of picoseconds to the order of 10 picoseconds. In practice, however, a tailing phenomenon of fall time on the order of nanoseconds in the PR effect caused by impurity trapping in the barrier layer undesirably occurs.

As described above, in pure optical modulation of a light wave, rise and fall response times are limited by running time of the optically excited carriers and capture in the impurity level even in actual carrier excitation using a quantum well structure.

SUMMARY OF THE INVENTION

It is an object of the present invention to provide a method and apparatus capable of solving the conventional problems described above and modulating light at a very high speed on the order of picoseconds or less.

In order to achieve the above object of the present invention, there is provided an optical modulation apparatus comprising:

a semiconductor element having a quantum well structure;

means for applying an electric field to the quantum well structure of the semiconductor element;

means for supplying polarized probe light to the semiconductor element, the probe light emerging from the semiconductor element such that a polarization state thereof is changed by an electrooptical effect in the quantum well structure;

means for causing the semiconductor element to receive pump light which causes virtual charge excitation in the quantum well structure, the virtual charge excitation screening the electric field applied to the quantum well structure; and a polarizer for converting a change in polarization state of the light emerging from the semiconductor element into a change in intensity.

There is also provided a method of modulating light using the above apparatus, comprising the steps of:

applying an electric field to a quantum well structure of a semiconductor element;

causing polarized probe light to impinge on the semiconductor element, the probe light emerging from the semiconductor element such that a polarization state thereof is changed by an electrooptical effect in the quantum well structure;

causing the semiconductor element to receive pump light which causes virtual charge excitation in the quantum well structure, the virtual charge excitation screening the electric field applied t the quantum well structure; and causing a polarizer to convert a change in polarization state of the light emerging from the semiconductor element into a change in intensity.

According to an aspect of the present invention, there is provided an optical modulation apparatus comprising:

(a) a semiconductor element comprising
  a substrate,
  a first semiconductor layer of a first conductivity type formed on the substrate,
  a multiple quantum well layer formed on the first semiconductor layer,
  a second semiconductor layer of a second conductivity type formed on the multiple quantum well layer, and
  a pair of electrodes respectively electrically connected to the first and second semiconductor layers;
(b) a voltage source, connected to the pair of electrodes, for applying a reverse-biasing electric field to the semiconductor element;
(c) means for causing polarized probe light to impinge on the semiconductor element, the probe light emerging from the semiconductor element such that a polarization state thereof is changed by an electrooptical effect in the multiple quantum well layer;
(d) means for causing the semiconductor element to receive pump light which causes virtual charge excitation in the multiple quantum well layer, the virtual charge excitation screening the electric field applied to the quantum well structure; and
(e) a polarizer for converting a change in polarization state of the light emerging from the semiconductor element into a change in intensity. In the apparatus of the present invention, the optical anisotropy of the refractive index of the quantum well structure is excited through an electrooptical effect using the transient spatial electric field generated by virtual excitation (excitation during only light radiation) of the carriers in the quantum well structure. The polarization state of light propagating through the quantum well structure is changed by this optical anisotropy of the refractive index. In this manner, the apparatus of the present invention utilizes a phenomenon wherein wave functions of virtually excited electron-hole pairs become asymmetrical due to a static field applied to the semiconductor quantum well structure, and transient virtual charge polarization is occurs. Both the rise and fall response speeds are related to the virtual carrier excitation process. Therefore, high-speed modulation on the order of, e.g., about subpicoseconds can be performed.

BRIEF DESCRIPTION OF THE DRAWINGS

FIG. 3 is an energy band diagram for explaining virtual charge polarization excitation according to the present invention;

DETAILED DESCRIPTION OF THE PREFERRED EMBODIMENT

Figure 1:
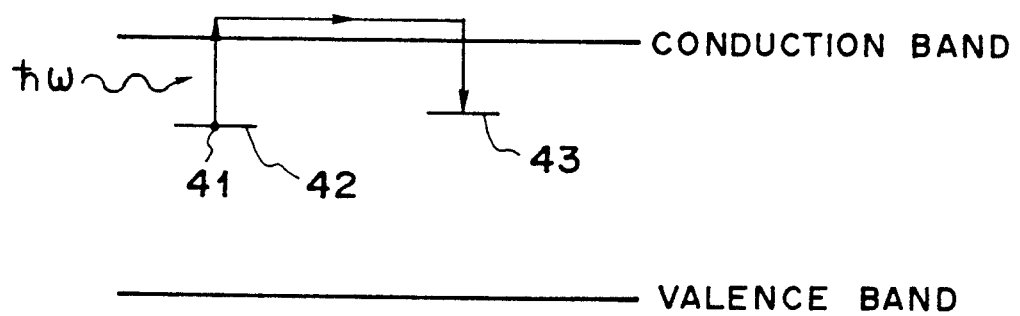
FIG. 1 is an energy band diagram for explaining the principle of a change in refractive index by a conventional PR effect.

A virtual charge polarization excitation phenomenon in a quantum well will be described below. This phenomenon is described in, e.g., Applied Physics, Masamichi Yamanishi, Vol. 58, pp. 1696-1707 (1989). FIG. 3 shows a quantum well structure in which a DC (static) electric field is applied in a direction parallel to the direction of the thickness of the quantum well layer. Wave functions 13 and 14 of a ground subband 11 of a conduction band and a ground subband of a valence band are spatially asymmetrical to each other due to an inclined band structure. For this reason, as compared with a case wherein a DC electric field is not applied, an effective energy gap and a vibrator intensity are changed, and optical diffusion characteristics (absorption index and wavelength dependency of refractive index) are changed. Under this condition, a nonresonant light having optical energy hv detuned from the excitation energy gap between the ground subbands 11 and 12 is incident on this band structure, electron excitation caused by coherent virtual transition occurs. At this time, wave functions 17 and 18 of the virtually excited electron-hole pairs become asymmetrical, as shown in FIG. 3, due to the DC electric field applied to the quantum well structure. Transient virtual charge polarization occurs during the light incidence. This polarization acts as a counter electric field E in a direction to screen the DC electric field, i.e., in a direction to cancel the DC electric field. Since this process is virtual carrier excitation, each of the rise and fall response speeds is on the order of subpicoseconds. At this time, a voltage drop V in the quantum well structure, caused by the counter electric field E, is given as follows:

$$V = E \times L \times N$$

where E is the counter electric field, L is the width of each quantum well, and N is the number of quantum wells.

Since a semiconductor constituting a quantum well structure generally has an electrooptical effect (i.e., a Pockels effect) in an atomic structure of constituent elements with respect to the static electric field, in addition to the electrooptical effect obtained by the initially applied DC electric field, a change in electrooptical effect caused by the counter electric field E occurs. This indicates that the optical anisotropy of the quantum well structure which is induced upon application of the DC electric field is further changed by the counter electric field E.

A relative change $\Delta\psi$ of the refractive index caused by the optical anisotropy, which change occurs due to the voltage drop V caused by the counter electric field E, is given as follows:

$$\Delta\psi = 2\pi/\lambda \cdot q n^3 r_{\text{eff}} V \tag{1}$$

where $\lambda$ is the wavelength in a vacuum, q is the constant depending on a relationship between the crystal orientation and the DC electric field, n is the refractive index, and $r_{\text{eff}}$ is the effective electrooptical coefficient.

The present invention utilizes the above change in refractive index to change the polarization state of light, thereby modulating the light.

Figure 4:
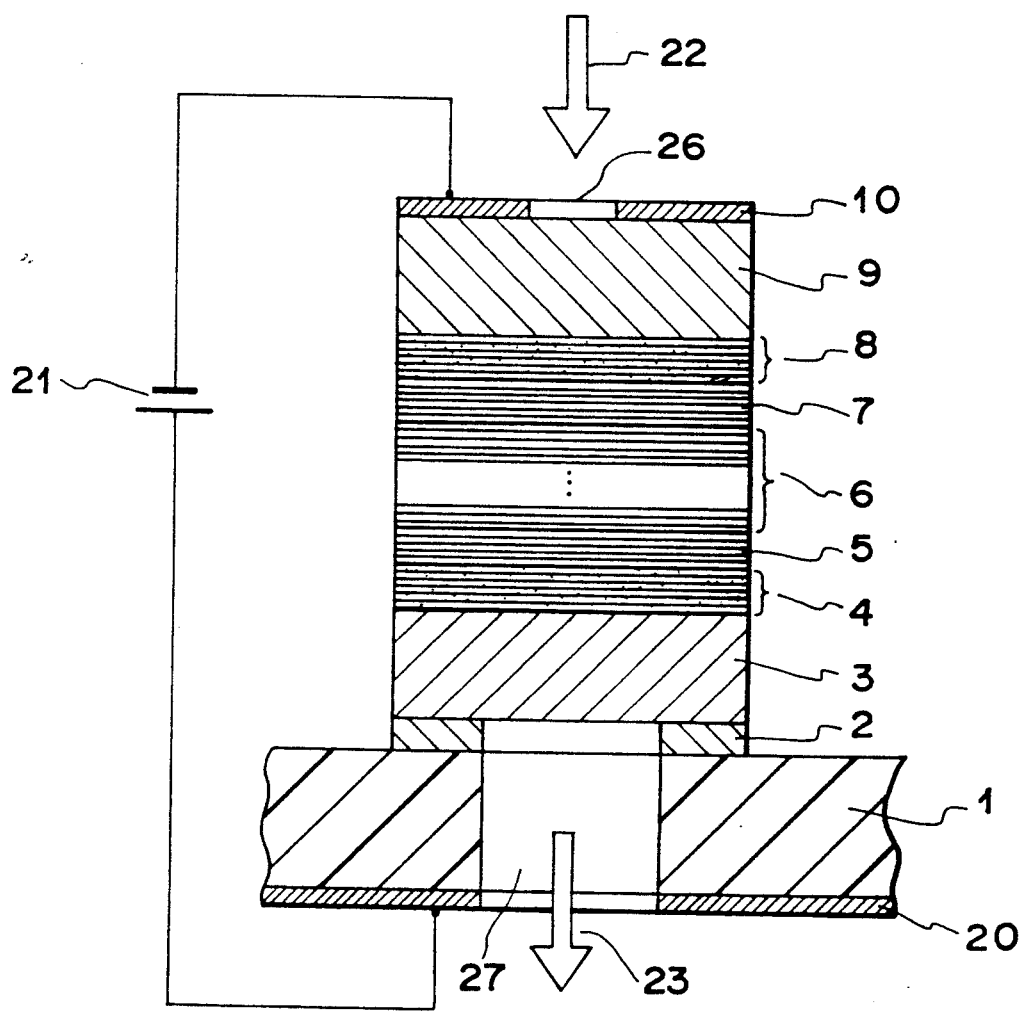
FIG. 4 is a schematic sectional view showing a semiconductor element used in the present invention.

FIG. 4 is a schematic sectional view of a semiconductor element used in the present invention. Referring to FIG. 4, the semiconductor element comprises an n+-GaAs substrate 1, an n+-GaAs buffer layer 2 for epitaxial growth, an n+-AlGaAs etching stopper layer 3, an n-type semiconductor contact layer 4 having a superlattice structure, a nondoped intrinsic (i-) semiconductor buffer layer 5 having a superlattice structure, and an i-type semiconductor multiple quantum well layer 6. A buffer layer 7 has a superlattice structure consisting of an i-type semiconductor, a contact layer 8 has a superlattice structure consisting of a p-type semiconductor, and a top contact layer 9 consists of p+-AlGaAs.

A p-type electrode 10 is formed on the top contact layer 9, and an n-type electrode 20 is formed on the bottom surface of the substrate 1. The electrode 10 has a ring-like shape having an opening 26. Incident light 22 consisting of probe light and pump light (to be described later) is incident through the opening 26. On the other hand, a hole 27 is commonly formed in the electrode 20, the substrate 1, and the buffer layer 2. Light 23 having a changed polarization state emerges through the opening 27. A reverse-biasing DC voltage from a voltage source 21 is applied across the electrodes 10 and 20.

The above semiconductor element is manufactured as follows.

The 0.5-$\mu$m thick n+-GaAs buffer layer 2 and the 1-$\mu$m thick n+-AlGaAs etching stopper layer 3 were sequentially grown on the n -GaAs substrate 1. 29-Å thick n+-GaAs layers and 69-Å thick n+-AlGaAs layers were alternately grown on the layer 3 by 20 cycles to form the contact layer 4. 29-Å thick i-GaAs layers and 69-Å thick i-AlGaAs layers were alternately grown on the layer 4 by 30 cycles to form the buffer layer 5. Well layers each consisting of 100-Å thick i-AlGaAs and barrier layers each consisting of 100-Å thick i-AlAs were alternately grown by 20 cycles to form the multiple quantum well layer 6. 29-Å thick i-GaAs layers and 69-Å thick i-AlGaAs layers were alternately grown on the multiple quantum well layer 6 by 30 cycles to form the buffer layer 7, and 29-Å thick p+-GaAs layers and 69-Å thick p+-AlGaAs layers were alternately grown on the layer 7 by 20 cycles to form the contact layer 8. The 1-$\mu$m thick p+-AlGaAs top contact layer 9 was grown on the layer 8. Molecular beam epitaxy (MBE) was used to grow the above semiconductor layers. An organic metal chemical vapor deposition (MO-CVD) method may be used in place of MBE.

An AuGe film was deposited on the contact layer 9 and was etched while leaving a ring-like portion to form the electrode 10. A CrAuNi film was deposited on the bottom surface of the substrate 1 to form the electrode 20. Finally, the electrode 20, the substrate 1, and the buffer 2 were partially etched to reach the etching stopper layer 3, thereby forming the opening 27.

Figure 5A:
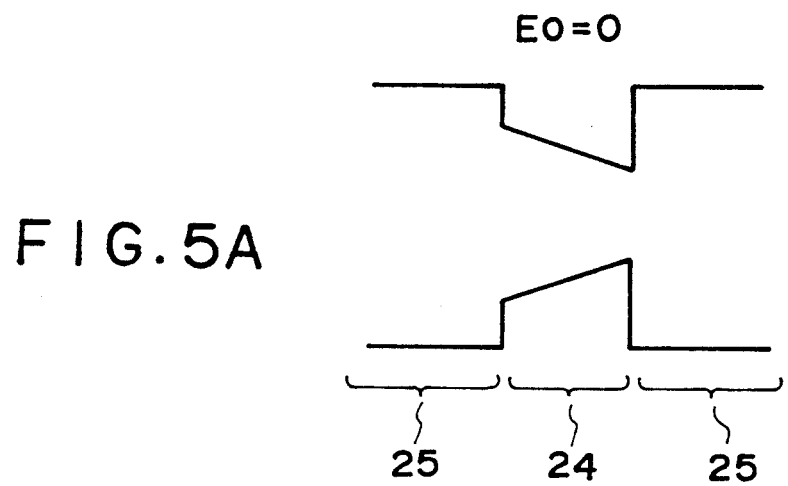
FIGS. 5A and 5B are energy band diagrams of the quantum well layer of FIG. 4, respectively, showing the states wherein an electric field is not applied and is applied.
Figure 5B:
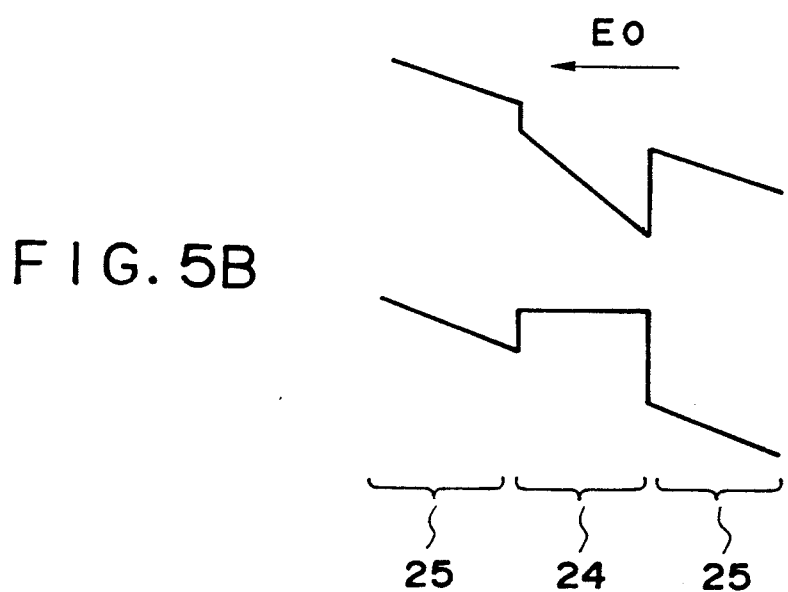

The energy band diagrams of the multiple quantum well layer of the semiconductor element obtained as described above are shown in FIGS. 5A and 5B. Referring to FIGS. 5A and 5B, each energy gap represents a quantum well layer 24 and barrier layers 25. FIG. 5A shows a state wherein an external electric field Eo is not applied from the voltage source 21. The quantum well layer 24 consists of $Al_xGa_{1-x}As$, and the barrier layer consists of AlAs. A composition ratio x in the well layer 24 is determined that the ratio is continuously changed from x=0.3 in the direction of the thickness, so that the well layer 24 has an inclined band gap.

When the reverse-biasing electric field Eo is applied from the voltage source 21 to the above quantum well structure, the energy state is changed, as shown in FIG. 5B. In this state, when pump light which causes virtual charge excitation is incident on the quantum well structure, charge polarization is formed only during the light incidence to generate the counter electric field E, as described with reference to FIG. 3. The voltage drop V is caused by this counter electric field E.

Figure 2A:
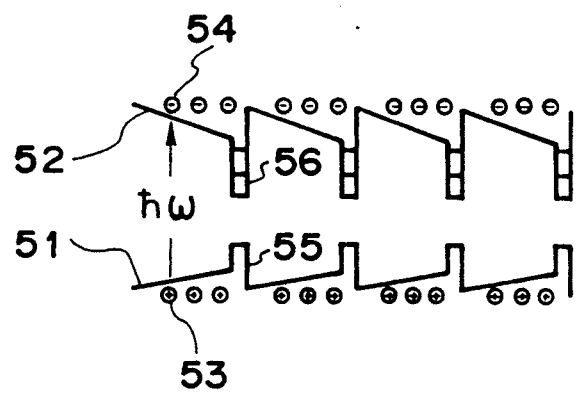
FIGS. 2A to 2C are energy band diagrams for explaining a conventional electrooptical element using the PR effect.
Figure 2B:
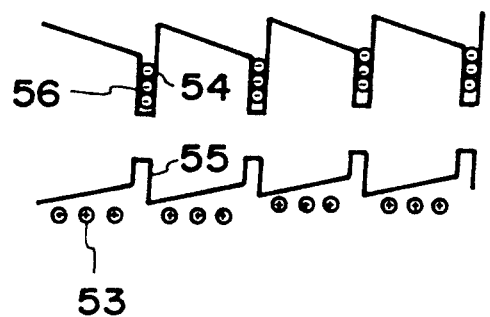
Figure 2C:
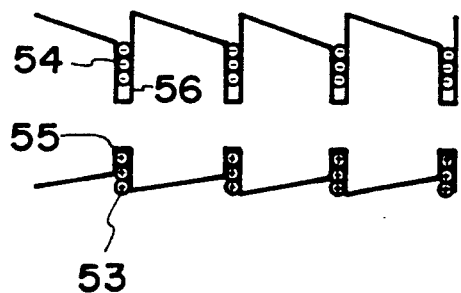

Numeric values of the voltage drop V are described in IEEE. J. Quantum Electron, M. Yamanishi and M. Kurosaki. Vol. QE-24, pp. 325–331 (1988). That is, assume a $Ga_{1-x}Al_xAs/AlAs$ graded gap (the gap is linearly changed up to 30%) quantum well structure. If L (quantum well width)=20 nm, Eo (DC electric field)=90 kV/cm, N (the number of quantum wells)=25, Iin (input light intensity)=1 GW/cm², and a detuning energy is 50 meV, then V=0.4 V. A substitution of this value into equation (1) yields a relative phase difference between the <110> and <$\overline{1}10$> directions as $\Delta\psi = 1.4 \times 10$ radian=0.08° under the conditions that $\lambda = 1.06$ $\mu$m, q=1, n=3.48, and $r_{eff}=1.4 \, 10^{-12}$ m/V when a direction of a thickness of stacked layers of the quantum well structure is defined as the <001> direction. This value represents a phase change almost equal to that obtained by the method of Ralph et. al. in FIGS. 2A to 2C. This result also indicates that a phase difference equal to that described above can be obtained even in a non-graded gap structure wherein the quantum wells are constant. When this change in phase, i.e., a change in polarization state is changed into a change in light intensity by the polarizer, optical polarization can be performed at a very high speed. An optical modulation apparatus utilizing this according to the present invention will be described below.

Figure 6:
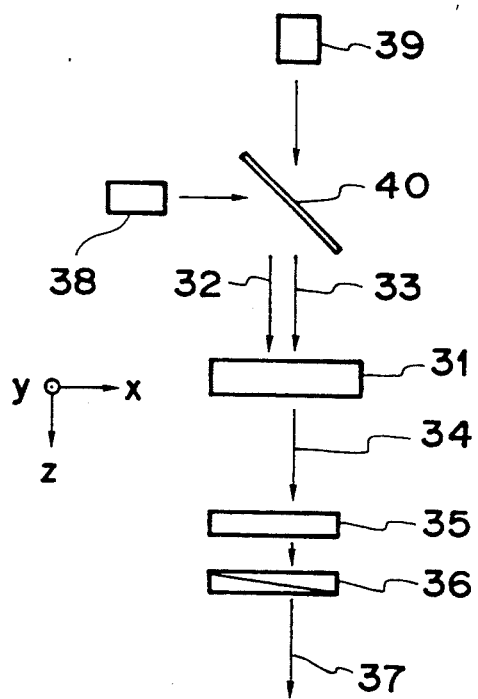
FIG. 6 is a schematic view showing an optical modulation apparatus according to an embodiment of the present invention.

FIG. 6 is a schematic view showing an optical modulation apparatus according to an embodiment of the present invention. A semiconductor element 31 is identical to that shown in FIG. 4. A probe light source 39 outputs polarized probe light 33 to the semiconductor element 31. A pump light source 38 outputs pump light 32 to the semiconductor element 31. An optical element 40 synthesizes the probe light 33 and the pump light 32. Light 34 passing through the semiconductor element 31 and having a change in polarization state passes through a phase plate 35, so that the phase of the light is adjusted Light having passed through the phase plate 35 passes through a polarizer 36, so that the change in polarization state is converted into a change in intensity, thereby obtaining intensity-modulated light 37.

Referring to FIG. 6, when the pump light 32 having an appropriate wavelength and an appropriate light intensity which allow induction of virtual charge polarization is incident on the semiconductor element 31 while the DC electric field is being applied to the semiconductor element 31, a voltage change occurs in the quantum well structure. When the probe light 33 having an appropriate polarization state is incident on the semiconductor element 31 in a direction of the crystal axis of the semiconductor constituting the element, this probe light is subjected to a phase change $\Delta\psi$ in the quantum well structure. For example, the probe light is constituted by polarized light having components having identical magnitudes in the <110> direction as the x-axis and the <$\overline{1}10$> direction as the y-axis when the z-axis is defined as the <001> direction in FIG. 6.

The probe light 33 should not be preferably absorbed by the semiconductor element 31 but has a wavelength sufficiently sensitive to the electrooptical effect. The change in phase of the light 34 having passed through the semiconductor element 31 is converted into a change in light intensity by the phase plate 35 and the polarizer 36, and this light is output as the modulated light 37. A light intensity I of the modulated light 37 can be obtained as follow:

$$I = \frac{1}{2} \cdot Io\{1 + \sin2\theta\cos\psi\} \quad (2)$$

where Io is the total light intensity of the transmitted light 34, and $\theta$ is the angle of the transmission axis of the polarizer 36 with respect to the x-axis. If a phase difference of the phase plate 35 between the x-axis and the y-axis is $\phi$, a phase difference of the probe light 33 between the x-axis and the y-axis is $\rho$, and a phase difference of the incident probe light 33 at the semiconductor element 31 between the x-axis and the y-axis of the optical anisotropy is $\epsilon$, then $\psi$ is defined as follows:

$$\psi = \Delta\psi + \rho + \phi + \epsilon \quad (3)$$

If the phase difference $\phi$ of the phase plate 35 is set to satisfy the following condition for $\theta = \pi/4$:

$$\phi = -\rho - \epsilon \pm \pi/2 \quad (4)$$

$$I = \frac{1}{2} \cdot Io(1 \mp \sin\Delta\psi) \quad (5)$$

It should be noted that a bias point is set to $\psi = \pm \pi/2$ to optimize a change in $\Delta\psi$. In the above case, a phase difference between the orthogonal polarized components of the probe light 33 is arbitrarily determined. However, the phase difference $\rho$ may be given in advance to satisfy condition (4). In this case, the phase plate 35 need not be located at the position indicated in FIG. 6. That is, the phase plate 35 may be located in front of the semiconductor element 31 to satisfy the condition (4). Alternatively, circularly polarized light having the phase difference $\rho$ of $\pm\pi/2$ may be used as the probe light 33 to split it into x- and y-axis polarized components by using a Wollaston polarizing prism or a normal polarizing prism, thereby performing differential detection.

In the above case, as the waveform of the probe light 33 can have a region sensitive to the electrooptical effect according to the present invention, the wavelength of light not absorbed in the semiconductor element 31 can be selected from a wider range. The pump light 32 and the probe light 33 which are split light components in FIG. 6 may be combined as single light. In this case, the pump light also serves as probe light. Absorption of the pump light is very small because only virtual charge induction occurs.

In the embodiment shown in FIG. 6, the pump light 32 and the probe light 33 are vertically incident on the quantum well structure of the semiconductor element 31. However, the same effect as described above can be obtained even if the pump light 32 and the probe light 33 are parallelly incident on the quantum well structure or when one of the pump light 32 and the probe light 33 is vertically incident on the quantum well structure and the other is parallely incident on the quantum well structure. In this case, it is preferable to guide the pump light 32 or the probe light 33 through a waveguide extending in a direction perpendicular to the quantum well structure so as to enhance the interaction and increase the light intensity.

Thin-film structures having a high reflectance may be formed on both sides of the quantum well structure of the element 31 to constitute a resonator structure. The resonator may satisfy a resonant condition (or does not satisfy) of a refractive index for one of the axes of optical anisotropy upon application of a DC electric field while virtual charge excitation does not occur (i.e., while the pump light is not incident). With this arrangement, when virtual charge excitation occurs, the resonant condition is changed to largely change the light transmittance or reflectance of the probe light polarized component parallel to the optical axis. Therefore, the polarization state of the transmitted or reflected light of the probe light is largely changed to increase an S/N ratio.

The present invention is not limited to the particular embodiment described above. Various changes and modifications may be made within the spirit and scope of the invention. These changes and modifications may be incorporated without departing from the scope of the appended claims.

What is claimed is:

1. An optical modulation apparatus comprising:
   a semiconductor element having quantum well structure;
   means for applying an electric field to the quantum well structure of said semiconductor element;
   means for supplying polarized probe light to said semiconductor element, the probe light whose polarization state is changed form an incident state by an electrooptical effect caused by the application of the electric field emerging from said semiconductor element;
   means for causing said semiconductor element to receive pump light which causes virtual charge excitation in said quantum well structure, wherein the electric field applied to said quantum well structure is screened by the virtual charge excitation and an amount of the electrooptical effect is varied by said screening so that the polarization state of the probe light emerging from said semiconductor element varies in accordance with the variation in the amount of the electrooptical effect; and
   a polarizer for converting the variation in the polarization state of the probe light emerging from said semiconductor element into a variation in intensity.

2. An apparatus according to claim 1, wherein said quantum well structure comprises a quantum well layer and barrier layers which sandwich said quantum well layer therebetween, said quantum well layer having a band gap inclined in a direction of a thickness thereof.

3. An apparatus according to claim 1, further comprising a phase plate located in a probe light optical path extending to said polarizer.

4. An apparatus according to claim 1, wherein the probe light has an x-axis polarized component having a magnitude equal to that of a y-axis polarized component and is incident on said semiconductor element along a z-axis when a <001> direction of a crystal constituting said semiconductor element is defined as the z-axis, a <110> direction is defined as an x-axis, and a <$\overline{1}10$> direction is defined as a y-axis.

5. A method of modulating light by using a polarizer and a semiconductor element having a quantum well structure, comprising the steps of:
   applying an electric field to said quantum well structure of said semiconductor element;
   causing polarized probe light to be incident on said semiconductor element, the probe light emerging from said semiconductor element whose polarization state is changed from the incident state by an electrooptical effect caused by the application of the electric field emerging form said semiconductor element;

causing said semiconductor element to receive pump light which causes virtual charge excitation in said quantum well structure, wherein the electric field applied to said quantum well structure is screened by the virtual charge excitation and the amount of the electrooptical effect is varied by said screening so that the polarization state of the probe light emerging from said semiconductor element varies in accordance with the variation in an amount of the electrooptical effect; and causing said polarizer to convert the variation in polarization state of the probe light emerging form said semiconductor element into a variation in intensity.

6. A method according to claim 5, wherein the probe light has an x-axis polarized component having a magnitude equal to that of a y-axis polarized component and is incident on said semiconductor element along a z-axis when a <001> direction of a crystal constituting said semiconductor element is defined as the z-axis, a <110> direction is defined as an x-axis, and a <$\overline{1}10$> direction is defined as a y-axis.

7. An apparatus for changing polarization state of light comprising:

a semiconductor element having a quantum well structure;

means for applying an electric field to the quantum well structure of said semiconductor element;

means for supplying polarized probe light to said semiconductor element, the probe light whose polarization state is changed form the incident state by an electrooptical effect caused by the application of the electric field emerging from said semiconductor element; and means for causing said semiconductor element to receive pump light which causes virtual charge excitation in said quantum well structure, wherein the electric field applied to the quantum well structure is screened by the virtual charge excitation and an amount of the electrooptical effect is varied by the screening so that the polarization state of the probe light emerging from said semiconductor element varies in accordance with the variation in the amount of the electrooptical effect.

8. An apparatus according to claim 7, wherein said quantum well structure comprises a quantum well layer and barrier layers which sandwich said quantum well layer therebetween, said quantum well layer having a band gap inclined in a direction of a thickness thereof.

9. An apparatus according to claim 7, wherein the probe light has an x-axis polarized component having a magnitude equal to that of a y-axis polarized component and is incident on said semiconductor element along a z-axis when a <001> direction of a crystal constituting said semiconductor element is defined as the z-axis, a <110> direction is defined as an x-axis, and a <$\overline{1}10$> direction is defined as a y-axis.

10. A method of varying a polarization state of light by using a semiconductor element having a quantum well structure, comprising the steps of:

applying an electric field to a quantum well structure of a semiconductor element;

causing polarized probe light to be incident on said semiconductor element, the probe light whose polarization state is changed form the incident sate by an electrooptical effect caused by the application of the electric field emerging form said semiconductor element; and causing said semiconductor element to receive pump light which causes virtual charge excitation in said quantum well structure, wherein the electric field applied to said quantum well structure is screened by the virtual charge excitation and an amount of the electrooptical effect is varied by said screening so that the polarization state of the probe light emerging from said semiconductor element varies in accordance with the variation in the amount of the electrooptical effect.

11. A method according to claim 10, wherein the probe light has an x-axis polarized component having a magnitude equal to that of a y-axis polarized component and is incident on said semiconductor element along a z-axis when a <001> direction of a crystal constituting said semiconductor element is defined as the z-axis, a <110> direction is defined as an x-axis, and a <$\overline{1}10$> direction is defined as a y-axis.

12. An optical modulation apparatus comprising:
(a) a semiconductor element comprising:
a substrate, ,
a first semiconductor layer of a first conductivity type formed on said substrate,
a multiple quantum well layer formed on said first semiconductor layer,
a second semiconductor layer of a second conductivity type formed on said multiple quantum well layer, and
a pair of electrodes respectively electrically connected to said fist and second semiconductor layers;
(b) a voltage source, connected to said pair of electrodes, for applying a reverse-biasing electric field to said semiconductor element;
(c) means for causing polarized probe light to be incident on said semiconductor element, the probe light whose polarization state is changed from the incident state by an electrooptical effect caused by the application of the electric field emerging from said semiconductor element;
(d) means for causing said semiconductor element to receive pump light which causes virtual charge excitation in said multiple quantum well layer, wherein the electric field applied to said quantum well layer is screened by the virtual charge excitation and an amount of the electrooptical effect is varied by said screening so that the polarization state of the probe light emerging from said semiconductor element varies in accordance with the variation in the amount of the electrooptical effect; and
(e) a polarizer for converting the variation int eh polarization state of the probe light emerging from said semiconductor element into a variation in intensity.

13. An apparatus according to claim 12, wherein said quantum well structure comprises a quantum well layer and barrier layers which sandwich said quantum well layer therebetween, said quantum well layer having a band gap inclined in a direction of a thickness thereof.

14. An apparatus according to claim 12, wherein said multiple quantum well layer comprises a plurality of AlGaAs quantum well layers and a plurality of AlAs barrier layers, which are alternately stacked on each other.

15. An apparatus according to claim 12, wherein said substrate and said electrodes have openings through which the probe light is transmitted.

16. An apparatus according to claim 12, further comprising a phase plate located in a probe light optical path extending to said polarizer.

17. An apparatus according to claim 12, wherein the probe light has an x-axis polarized component having a magnitude equal to that of a y-axis polarized component and is incident on said semiconductor element along a z-axis when a <001> direction of a crystal constituting said semiconductor element is defined as the z-axis, a <110> direction is defined as an x-axis, and a <$\overline{110}$> direction is defined as a y-axis.

18. An apparatus for varying a polarization state of light comprising:
  (a) a semiconductor element comprising a substrate,
      a first semiconductor layer of a first conductivity type formed on said substrate,
      a multiple quantum well layer formed on said first semiconductor layer,
      a second semiconductor layer of a second conductivity type formed on said multiple quantum well layer, and
      a pair of electrodes respectively electrically connected to said fist and second semiconductor layers;
  (b) a voltage source, connected to said pair of electrodes, for applying a reverse-biasing electric field to said semiconductor element;
  (c) means for causing polarized probe light to be incident on said semiconductor element, the probe light whose polarization state is changed from the incident state by an electrooptical effect caused by the application of the electric field emerging from said semiconductor element; and
  (d) means for causing said semiconductor element to receive pump light which causes virtual charge excitation in said multiple quantum well layer, wherein the electric field applied to said quantum well layer is screened by the virtual charge excitation and an amount of the electrooptical effect is varied by said screening so that the polarization state of the probe light emerging from said semiconductor element varies in accordance with the variation in the amount of the electrooptical effect.

19. An apparatus according to claim 18, wherein said quantum well structure comprises a quantum well layer and barrier layers which sandwich said quantum well layer therebetween, said quantum well layer having a band gap inclined in a direction of a thickness thereof.

20. An apparatus according to claim 18, wherein said multiple quantum well layer comprises a plurality of AlGaAs quantum well layers and a plurality of AlAs barrier layers, which are alternately stacked on each other.

21. An apparatus according to claim 18, wherein said substrate and said electrodes have openings through which the probe light is transmitted.

22. An apparatus according to claim 18, wherein the probe light has an x-axis polarized component having a magnitude equal to that of a y-axis polarized component and is incident on said semiconductor element along a z-axis when a <001> direction of a crystal constituting said semiconductor element is defined as the z-axis, a <110> direction is defined as an x-axis, and a <$\overline{110}$> direction is defined as a y-axis.

23. An optical modulation apparatus comprising:
  a semiconductor element having quantum well structure;
  means for applying an electric field to said quantum well structure of said semiconductor element;
  means for causing a polarized probe light to be incident on said semiconductor element, the probe light whose polarization state is changed form the incident state by the electrooptical effect caused by the application of.the electric field emerging form said semiconductor element;
  means for causing said semiconductor element to receive pump light which causes a virtual charge excitation in said quantum well structure, wherein the electric field applied to said quantum well structure is screened by the virtual charge excitation and an amount of the electrooptical effect is varied by said screening so that the polarization state of the probe light emerged form said semiconductor element varies in accordance with the variation in the amount of the electrooptical effect;
  a polarizer for converting the variation in the polarization state of the probe light emerged from said semiconductor element into a variation in intensity; and
  a phase plate disposed in a probe light path extending to said polarizer,
  wherein when a <001> direction of a crystal constituting said semiconductor element is defined as a z-direction, a <110> direction thereof is defined as an x-direction, and a <$\overline{110}$> direction thereof is defined as a y-axis direction, the probe light has a polarized state in which the magnitude of the polarized component in the x-axis direction is equal to that in the y-axis direction and the probe light is incident on said semiconductor element along the z-axis direction, and wherein the following condition is satisfied, $$\theta = \pi/4$$

$$\Phi = \rho - \epsilon \pm \pi/2$$

where $\theta$ is an angle of a transmission axis of said polarizer with respect to the x-axis, $\ominus$ is a relative phase difference between the x-axis and the y-axis of said semiconductor element when the probe light is not incident thereon, $\rho$ is a phase difference between the polarized component of the probe light in the x-axis direction and that in the y-axis direction, and $\Phi$ is a phase difference of said phase plate.

24. An apparatus according to claim 23, wherein said quantum well structure comprises a quantum well layer and barrier layers which sandwich said quantum well layer therebetween, and said quantum well layer has a band gap inclined in a direction of thickness thereof.

25. An method of modulating light by using a phase plate, a polarizer and a semiconductor element having a quantum well structure, said method comprising the steps of:
  applying an electric field to the quantum well structure of said semiconductor element;
  causing polarized probe light to be incident on said semiconductor element, the probe light whose polarization state is changed from the incident state by the electrooptical effect caused by the application of the electric field emerging from said semiconductor element;

supplying into said semiconductor element pump light which causes virtual charge excitation in said quantum well structure, wherein the electric field applied to said quantum well structure is screened by the virtual charge excitation, and an amount of the electrooptical effect is varied by said screening so that the polarization state of the probe light emerging from said semiconductor element varies according to the variation in the amount of the electrooptical effect; and converting the variation in the polarization state of the probe light into a variation in intensity by causing the probe light emerged from said semiconductor element to be incident on said polarization through said phase plate, wherein when a <001> direction of a crystal constituting said semiconductor element is defined as a z-axis direction, a <1̄10> direction thereof is defined as x-axis direction and a <11̄0> direction thereof is defined as a y-axis direction, the probe light has a polarization state in which the magnitude of the polarized component in the x-axis direction is equal to that in the y-axis direction and the probe light is incident on said semiconductor element along the z-axis direction, and wherein the following condition is satisfied, $$\theta = \pi/4$$

$$\Phi = -\epsilon \pm \pi/2$$

where $\theta$ is an angle of a transmission axis of said polarizer with respect to the x-axis, $\epsilon$ is a relative phase difference between the x-axis and the y-axis of said semiconductor element when the probe light is not incident thereon, $\rho$ is a phase difference between the polarized component of the probe light in the x-axis direction and that in the y-axis direction and $\Phi$ is a phase difference of said phase plate.

26. An optical modulation apparatus comprising:
(a) a semiconductor element comprising:
   a substrate,
   a first semiconductor layer of a first conductivity type formed on said substrate,
   a multiple quantum well layer formed on said first semiconductor layer,
   a second semiconductor layer of a second conductivity type formed on said multiple quantum well layer, and
   a pair of electrodes respectively electrically connected to said fist and second semiconductor layers;
(b) a voltage source, connected to said pair of electrodes, for applying a reverse-biasing electric field to said semiconductor element;

(c) means for causing polarized probe light to be incident on said semiconductor element, the probe light whose polarization state is changed from the incident state by the electrooptical effect caused by the application of the electric field emerging from said semiconductor element;

(d) means for causing said semiconductor element to receive pump light which causes virtual charge excitation in said multiple quantum well layer, wherein the electric field applied to said quantum well layer is screened by the virtual charge excitation and an amount of the electrooptical effect is varied by said screening so that the polarization state of the probe light emerged form said semiconductor element varies in accordance with the variation in the amount of the electrooptical effect;

(e) a polarizer for converting the variation in the polarization sate of the probe light emerged from said semiconductor element into a variation in intensity; and (f) a phase plate disposed in a probe light path extending to said polarizer, wherein when a <001> direction of a crystal constituting said semiconductor element is defined as a z-axis direction, a <110> direction thereof is defined as a x-axis direction, and a <110> direction thereof is defined as a y-axis direction, the probe light has a polarization state in which the magnitude of the polarized component in the x-axis direction is equal to that in the y-axis direction and the probe light is incident on said semiconductor element along the z-axis direction, and wherein the following condition is satisfied, $$\theta = \pi/4$$

$$\Phi = -\rho\epsilon \pm \pi/2,$$

where $\theta$ is an angle of a transmission axis of said polarizer with respect to the x-axis, $\epsilon$ is a relative phase difference between the x-axis and the y-axis of said semiconductor element when the probe light is not incident thereon, $\rho$ is a phase difference between eh polarized component of the probe light in the x-axis direction and that in the y-axis direction, and $\Phi$ is a phase difference of said phase plate.

27. An apparatus according to claim 26, wherein said quantum well structure comprises a quantum well layer and barrier layers which sandwich said quantum well layer therebetween, and said quantum well layer has a band gap inclined in a direction of thickness thereof.

28. An apparatus according to claim 26, wherein said multiple quantum well layer comprises a plurality of quantum well layers composed of AlGaAs and a plurality of barrier layers composed of AlAs, which are alternately stacked on each other.

29. An apparatus according to claim 26, wherein said substrate and said electrodes have openings through which the probe light is transmitted.

* * * * *

UNITED STATES PATENT AND TRADEMARK OFFICE
CERTIFICATE OF CORRECTION

PATENT NO. : 5,229,878
DATED : July 20, 1993
INVENTOR(S) : YASUO TOMITA ET AL.

Page 1 of 3

It is certified that error appears in the above-identified patent and that said Letters Patent is hereby corrected as shown below:

COLUMN 1

Line 36, "an" should be deleted.
Line 42, "Letters." should read --Letters,--.

COLUMN 2

Line 61, "t" should read --to--.

COLUMN 5

Line 28, "n -GaAs" should read --n+ GaAs--.

COLUMN 6

Line 19, "$\Delta\Psi=1.4 \times 10$" should read --$\Delta\Psi=1.4 \times 10^{-4}$--.

COLUMN 7

Line 5, "follow:" should read --follows:--.

COLUMN 9

Line 4, "form" should read --from--.
Line 17, "form" should read --from--.
Line 36, ""form" should read --from--.

UNITED STATES PATENT AND TRADEMARK OFFICE
CERTIFICATE OF CORRECTION

PATENT NO. : 5,229,878
DATED : July 20, 1993
INVENTOR(S) : YASUO TOMITA ET AL.

It is certified that error appears in the above-identified patent and that said Letters Patent is hereby corrected as shown below:

COLUMN 10

Line 3, "form" should read --from--.
Line 5, "form" should read --from--.
Line 36, "fist" should read --first--.
Line 58, "int eh" should read --in the--.

COLUMN 11

Line 29, "fist" should read --first--.

COLUMN 12

Line 10, "form" should read --from--.
Line 12, "form" should read --from--.
Line 21, "form" should read --from--.
Line 46, "$\theta$is" should read --$\theta$ is--.
Line 47, "$\theta$" should read --$\epsilon$--.

COLUMN 13

Line 20, "<110>" should read --<110>--.
Line 55, "fist" should read --first--.

UNITED STATES PATENT AND TRADEMARK OFFICE
CERTIFICATE OF CORRECTION

PATENT NO. : 5,229,878
DATED : July 20, 1993
INVENTOR(S) : YASUO TOMITA ET AL.

It is certified that error appears in the above-identified patent and that said Letters Patent is hereby corrected as shown below:

COLUMN 14

Line 14, "form" should read --from--.
Line 18, "sate" should read --state--.
Line 26, "<110>" should read --<$\overline{110}$>--.
Line 43, "eh" should read --the--.

Signed and Sealed this

Seventeenth Day of May, 1994

Attest:

BRUCE LEHMAN

Attesting Officer    Commissioner of Patents and Trademarks